United States Patent
Poyyara et al.

(10) Patent No.: US 9,547,825 B2
(45) Date of Patent: Jan. 17, 2017

(54) SELECTION OF DIVERSION TECHNIQUES BASED UPON WEIGHTED WELL CHARACTERISTICS

(71) Applicant: Halliburton Energy Services, Inc., Houston, TX (US)

(72) Inventors: Ragi Lohidakshan Poyyara, Pune (IN); Vijaya Kumar Patnana, Madurwada (IN)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/114,684

(22) PCT Filed: Jan. 6, 2015

(86) PCT No.: PCT/US2015/010319
§ 371 (c)(1),
(2) Date: Jul. 27, 2016

(87) PCT Pub. No.: WO2016/111680
PCT Pub. Date: Jul. 14, 2016

(65) Prior Publication Data
US 2016/0350670 A1 Dec. 1, 2016

(51) Int. Cl.
*G06N 7/00* (2006.01)
*E21B 43/25* (2006.01)
(Continued)

(52) U.S. Cl.
CPC .............. *G06N 7/005* (2013.01); *E21B 33/138* (2013.01); *E21B 43/25* (2013.01); *G06F 17/16* (2013.01); *E21B 33/14* (2013.01)

(58) Field of Classification Search
None
See application file for complete search history.

(56) References Cited

U.S. PATENT DOCUMENTS 5,827,803 A 10/1998 Loree
2004/0154801 A1 8/2004 Pandey
(Continued)

FOREIGN PATENT DOCUMENTS

WO 2005/017312 A1 2/2005

OTHER PUBLICATIONS

San Cristóbal, José Ramón. Multi criteria analysis in the renewable energy industry. Springer Science & Business Media, 2012.
(Continued)

*Primary Examiner* — Alan Chen
(74) *Attorney, Agent, or Firm* — John W. Wustenberg; Baker Botts L.L.P.

(57) ABSTRACT

A system for selecting diversion techniques includes a memory storage device and a processor. The processor is configured to, for each of several well characteristics, assign a weight to each of the several well characteristics, where the weight is indicative of the importance of the well characteristic to the selection of a diversion technique, and where not all of the weights are the same. The processor is further configured to calculate a desirability of each of several diversion techniques based upon, at least partially, the weights and the several well characteristics, and select a diversion technique based upon, at least partially, the calculated desirability of the several diversion techniques.

13 Claims, 9 Drawing Sheets

(51) Int. Cl.
　　　*E21B 33/138*　　　(2006.01)
　　　*G06F 17/16*　　　(2006.01)
　　　*E21B 33/14*　　　(2006.01)

(56) References Cited

U.S. PATENT DOCUMENTS

| | | |
|---|---|---|
| 2006/0010443 A1 | 1/2006 | Lahti et al. |
| 2007/0055536 A1 | 3/2007 | Caveny et al. |
| 2008/0016058 A1 | 1/2008 | Murphy et al. |
| 2009/0182694 A1 | 7/2009 | Boulatsel et al. |
| 2015/0060063 A1* | 3/2015 | Miller .................... E21B 43/26 166/279 |

OTHER PUBLICATIONS

Eigen Vector calculation for a matrix (Tutorial on Analytic Hierarchy Process) found at http://web.cjcu.edu.tw/~lcc/Couses/TUTORIAL/AHP%20Tutorial.doc, 14 pages.

Lev, Virine. "Analysis of Multi-Criteria Decision-Making Methodologies for the Petroleum Industry." International Petroleum Technology Conference. International Petroleum Technology Conference, 2007.

Triantaphyllou, Evangelos, and Stuart H. Mann. "An examination of the effectiveness of multi-dimensional decision-making methods: a decision-making paradox." Decision Support Systems 5.3 (1989): 303-312.

International Search Report and Written Opinion issued in related PCT Application No. PCT/US2015/010319 mailed Sep. 23, 2015, 13 pages.

\* cited by examiner

FIG. 2

| Well Characteristic | | Diversion Techniques | | | | | | |
|---|---|---|---|---|---|---|---|---|
| | Well Characteristic Options | Ball Sealers | Degradable Particulates | Foams | Gelled Acid | Crosslink Gel Slugs | RPM | No Diverter |
| Completion Type | open hole | 0 | 1 | 5 | 2 | 5 | 4 | 3 |
| | perforated | 4 | 2 | 2 | 3 | 3 | 4 | 3 |
| | gravel packed | 0 | 5 | 3 | 4 | 2 | 5 | 3 |
| | slotted liner | 0 | 3 | 5 | 5 | 2 | 3 | 3 |

Suitability of Diversion Techniques for Use with Various Well Characteristic Options

| Well Characteristic | Weight |
|---|---|
| Completion Type | 0.20 |
| Well Deviation | 0.125 |
| Temperature | 0.05 |
| Injectivity Contrast | 0.19 |
| Permeability | 0.105 |
| Interval Length | 0.08 |
| Reservoir Type | 0.13 |
| Reservoir Fluid | 0.04 |
| Well Type | 0.06 |
| Placement Technique | 0.02 |
| --Sum-- | 1 |

Normalized Weight for Each Well Characteristic

FIG. 3

| Well Characteristic | Weight | Well Characteristic Options | Diversion Techniques | | | | | | |
|---|---|---|---|---|---|---|---|---|---|
| | | | Ball Sealers | Degradable Particulates | Foams | Gelled Acid | Crosslink Gel Slugs | RPM | No Diverter |
| Completion Type | 0.20 | Open Hole | 0 | 1 | 5 | 2 | 5 | 4 | 3 |
| Well Deviation | 0.125 | <10 degrees | 4 | 5 | 3 | 5 | 4 | 4 | 2 |
| Temperature | 0.05 | <150 degrees F | 4 | 3 | 5 | 3 | 2 | 4 | 3 |
| Injectivity Contrast | 0.19 | Medium | 5 | 3 | 4 | 3 | 5 | 4 | 2 |
| Confidence Values | | | 0 | 69 | 97 | 79 | 100 | 95 | 71 |

FIG. 4

Confidence Values for Various Diversion Techniques Based upon Multiple Well Characteristics, Associated Weights, and Relative Suitability Values

SELECTION OF DIVERSION TECHNIQUES BASED UPON WEIGHTED WELL CHARACTERISTICS

CROSS-REFERENCE TO RELATED APPLICATION

The present application is a U.S. National Stage Application of International Application No. PCT/US2015/010319 filed Jan. 6, 2015, which is incorporated herein by reference in its entirety for all purposes.

TECHNICAL FIELD

This disclosure relates generally to the field of resource extraction and, more particularly, to hydrocarbon extraction and, more particularly, to a system, method, and program for the selection of diversion techniques based upon weighted well characteristics.

BACKGROUND

In oil wells and other systems for resource extraction, diversion techniques are often useful to access certain deposits, such as hydrocarbon deposits, by diverting a material to, or away from, a particular portion of the well. Each well may have many well characteristics associated with it, not all of which have the same weight on the selection of a diversion technique. Furthermore, certain diversion techniques often work more effectively with particular well characteristic options than with other well characteristic options. Unfortunately, as the number of diversion techniques and the knowledge of their applicability (or lack thereof) to certain well characteristics and well characteristic options grows, it becomes difficult to systematically select an appropriate diversion technique. A modified form of a Weighted Product Method type of multicriteria decision making, for example, may help form a systematic way of selecting an appropriate diversion technique. The same issues may apply to the selection of cements, drilling fluids, conformance fluids, acid fluids, etc.

BRIEF DESCRIPTION OF EXAMPLE EMBODIMENTS

Certain embodiments may be better understood, and their numerous objects, features, and advantages made apparent to those skilled in the art by referencing the accompanying drawings. The use of the same reference symbols in different drawings indicates similar or identical items.

FIG. 2 is a chart showing example suitability of various diversion techniques for use with various well characteristic options;

FIG. 3 is a chart showing example weights for an example set of well characteristics being evaluated;

FIG. 4 is a chart showing example confidence values for various diversion techniques, based upon well characteristics (e.g., the example set of well characteristics of FIG. 3), associated weights (e.g., the example weights of FIG. 3), and relative suitability values (e.g., the relative suitability values of FIG. 2).

DETAILED DESCRIPTION OF EXAMPLE EMBODIMENTS

Example embodiments of systems, methods, apparatuses, and/or other schemes are disclosed here, for example, the use of a modified form of a Weighted Product Method in selecting a diversion technique and its implementation via a computer system or computer readable medium. Certain embodiments may be better understood, and their numerous objects, features, and advantages made apparent to those skilled in the art by referencing the accompanying drawings. The use of the same reference symbols in different drawings indicates similar or identical items.

Figure 1A:
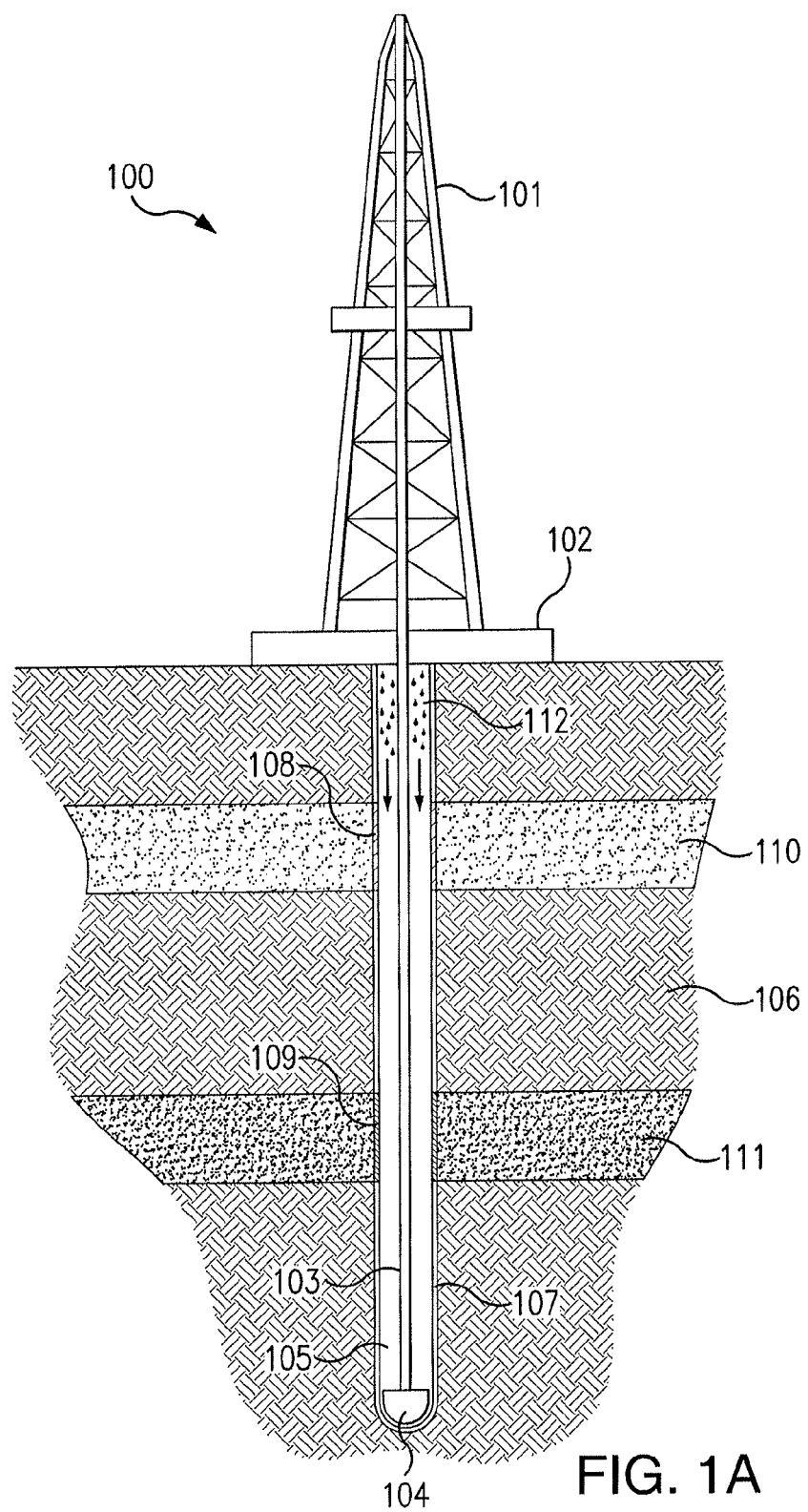
FIG. 1A is a diagram showing an example of a well for extracting deposits from the earth.

FIG. 1A is a diagram showing an example of a well 100 for extracting materials 110, 111, for example, hydrocarbons, from the earth. In this example, a derrick 101 may rest upon a platform 102. A drill bit 104 may be attached to derrick 101 and/or platform 102 via drill string 103 and is used to drill into the earth. As drill bit 104 drills, it may pass through a rock formation 106, as well as multiple areas containing a significant amount of materials 110, 111. This drilling creates a borehole 105. As drill bit 104 passes through materials 110, 111, a skin 107 (also known as a casing or a mud filter cake) may form near the edge of borehole 105. Skin 107 may comprise multiple skin segments 108, 109 that exist between borehole 105 and materials 110, 111.

In some cases, skin segments 108, 109 may reduce the flow of materials 110, 111 to borehole 105 and thus limit the production of well 100. In an effort to remove or reduce skin segments 108, 109, materials, such as acid 112, may be introduced into borehole 105 to, for example, dissolve skin segments 108, 109. Furthermore, different skin segments 108, 109 may differ in their relative permeability to acid 112, such that skin segment 108 may have a relatively low permeability compared to skin segment 109, which may have a relatively high permeability. This may, for example, cause acid 112 to affect high-permeability skin segment 109 much more than low-permeability skin segment 108 if acid 112 is allowed to interact with both skin segments 108, 109 at the same time. In such instances, a diversion technique may be useful to divert introduced material 112 such that both skin segments 108, 109 do not interact with material 112 at the same time.

Thus, FIG. 1A illustrates one example of a well or similar system that may benefit from the use of a diversion technique. Other types of wells, other issues that may require diversion techniques (e.g., other than described skin segments 108, 109), and other ways of mitigating these other issues (e.g., other than acid 112), including those known to persons of skill in the art, are contemplated.

Figure 1B:
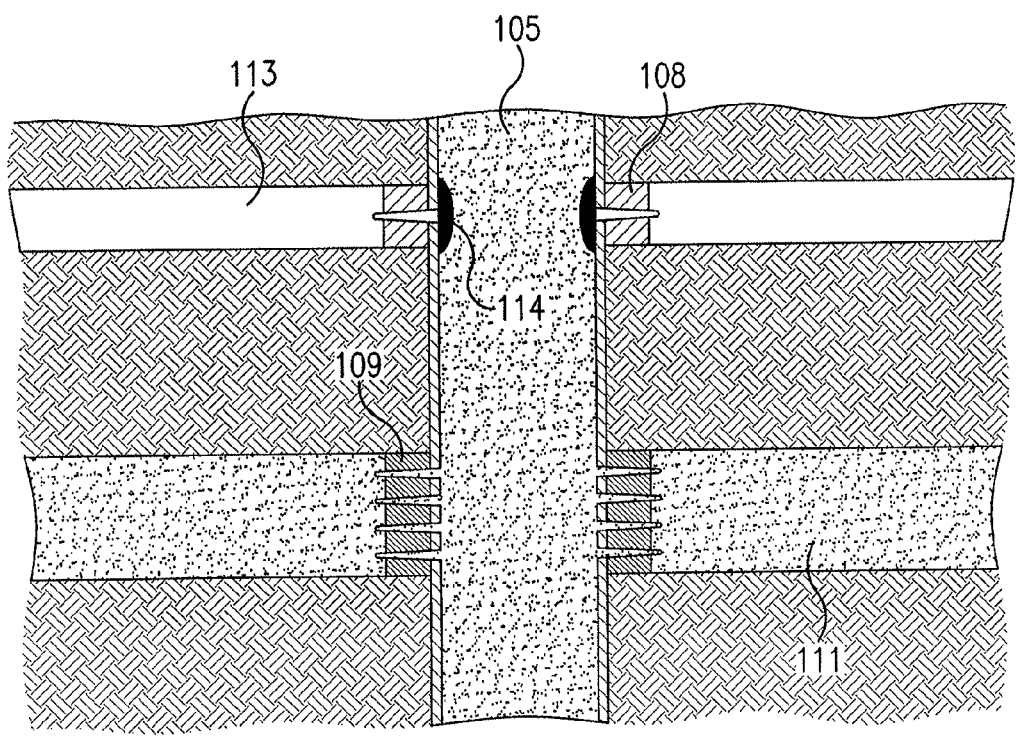
FIG. 1B is a diagram showing a portion of the well of FIG. 1A while an example diversion technique is being used.

FIG. 1B is a diagram showing a portion of well 100 from FIG. 1A while an example diversion technique is being used. In FIG. 1B, material 110 has already been extracted, leaving an empty area 113. A diversion material 114 blocks access to skin segment 108 (and empty area 113) such that acid 112 can be directed to skin segment 109, thereby reducing or removing skin segment 109. FIG. 1B further shows material 111 flowing into borehole 105 after skin 109 has been reduced or removed. This is merely one example of how a diversion technique may be used. As another example, where materials 110, 111 have not yet been extracted, diversion material 114 may block access to high-permeability skin segment 109 such that acid 112 can be directed to low-permeability skin segment 108, thereby reducing skin segment 108 such that both skin segments 108, 109 have about the same permeability. Diversion material 114 may then be removed and acid 112 directed to both skin segments 108, 109 to further reduce or remove skin segments 108, 109 and improve permeability. Materials 110, 111 may then flow into borehole 105 at a higher rate than if no diversion technique were used. These are merely examples of diversion techniques and their use. Other diversion techniques may be used in addition to or instead of the example diversion techniques, including ball sealers, degradable particulates, foams, gelled acid, crosslink gel slugs, relative permeability modifiers ("RPM"), and/or other diversion techniques known to persons of skill in the art. Because many diversion techniques may be used, it may be difficult to choose an appropriate diversion technique. Thus, a systematic way of determining an appropriate diversion technique is needed.

According to the disclosure, a particular diversion technique may be automatically selected by a computer by taking into account a variety of well characteristics. By selecting a diversion technique in this manner, an appropriate diversion technique can be selected based upon a relative importance of various well characteristics.

FIG. 2 is a chart 200 showing example suitability of various diversion techniques 206 for use with various well characteristic options 204. Information represented in FIG. 2 may be determined and/or evaluated by a system 700 of FIG. 7 comprising a computer system 701. Computer system 701 may further make such determination and/or evaluation by executing a diversion technique selection program 704, which may be stored on a computer readable medium.

In FIG. 2, a "Well Characteristic" column 201 of chart 200 lists well characteristics 202 being evaluated. For example, in chart 200, well characteristic 202 being evaluated is completion type. Other well characteristics can be evaluated in addition to or instead of completion type, such as well deviation, temperature, injectivity contrast, permeability, interval length, reservoir type, reservoir fluid, well type, placement technique, and other well characteristics known to persons of skill in the art.

A "Well Characteristic Options" column 203 of chart 200 lists certain options 204 available for each well characteristic 202 being evaluated. For example, in chart 200, options 204 shown for completion type well characteristic 202 include open hole, perforated, gravel packed, and slotted liner. Any subset of these options 204, and/or any other options pertaining to completion type known to persons of skill in the art, can be used. For other well characteristics 202, options 204 may include appropriate corresponding options. For example, for a temperature well characteristic, options 204 may include 0-50 degrees F., 50-100 degrees F., 100-150 degrees F., etc.

A "Diversion Techniques" column 205 of chart 200 lists various diversion techniques 206 being evaluated. In chart 200, diversion techniques 206 being evaluated include ball sealers, degradable particulates, foams, gelled acid, crosslink gel slugs, relative permeability modifiers ("RPM"), and no diverter. Any subset of these diversion techniques 206, and/or any other diversion techniques known to persons of skill in the art, can be evaluated. Furthermore, diversion techniques 206 may include diversion technique sub-types. For example, three different types of ball sealer diversion techniques can be evaluated against each other, or against each other as well as other diversion techniques.

Once diversion techniques 206 for evaluation and options 204 for each well characteristic 202 have been selected, relative suitability values 207 are assigned for each combination of option 204 and diversion technique 206. Each relative suitability value 207 indicates the suitability of a particular diversion technique 206 in conditions comprising a particular option 204. Relative suitability values 207 may be determined based upon field experience, literature, and/or by those skilled in the art. In chart 200, relative suitability values 207 range from 0 (indicating that a corresponding diversion technique is not suitable for use with a corresponding option) to 5 (indicating that a corresponding diversion technique is most suitable for use with a corresponding option). Any range of relative suitability values can be used. Furthermore, relative suitability values 207 may vary between users and over time. For example, FIG. 2 shows a relative suitability value of 4 for the intersection of a ball sealers diversion technique and a perforated completion type option, indicating that ball sealers have a high suitability in wells with a perforated completion type. Conversely, FIG. 2 shows a relative suitability value of 0 for the intersection of a ball sealers diversion technique and a gravel packed completion type option, indicating that ball sealers are not suitable in wells with a gravel packed completion type.

Thus, according to the teachings of the disclosure, a system, method, apparatus, or other scheme is used to select a diversion technique based on a plurality of well characteristics and weights associated with the plurality of well characteristics, where the weights are indicative of the importance of the well characteristic to the selection of a diversion technique. By selecting a diversion technique in this manner, an appropriate diversion technique can be selected based upon the relative importance of various well characteristics. Furthermore, when specific options for each well characteristic (representing certain conditions of a particular well) are taken into account, for example by incorporating relative suitability values, an appropriate diversion technique can be selected for the conditions of a particular well. This is thus an effective, efficient, accurate, and systematic approach to selecting an appropriate diversion technique, because it takes into account the relative importance of multiple well characteristics. By selecting diversion techniques in this manner, resource extraction becomes more efficient because more deposits are gathered from a given well more quickly, and for reduced costs. In addition, according to the teachings of the disclosure, a system, method, apparatus, or other scheme described herein can also be used with other technologies, such as for the selection of cements, drilling fluids, conformance fluids, fracturing fluids, acid fluids, etc.

Figure 5:
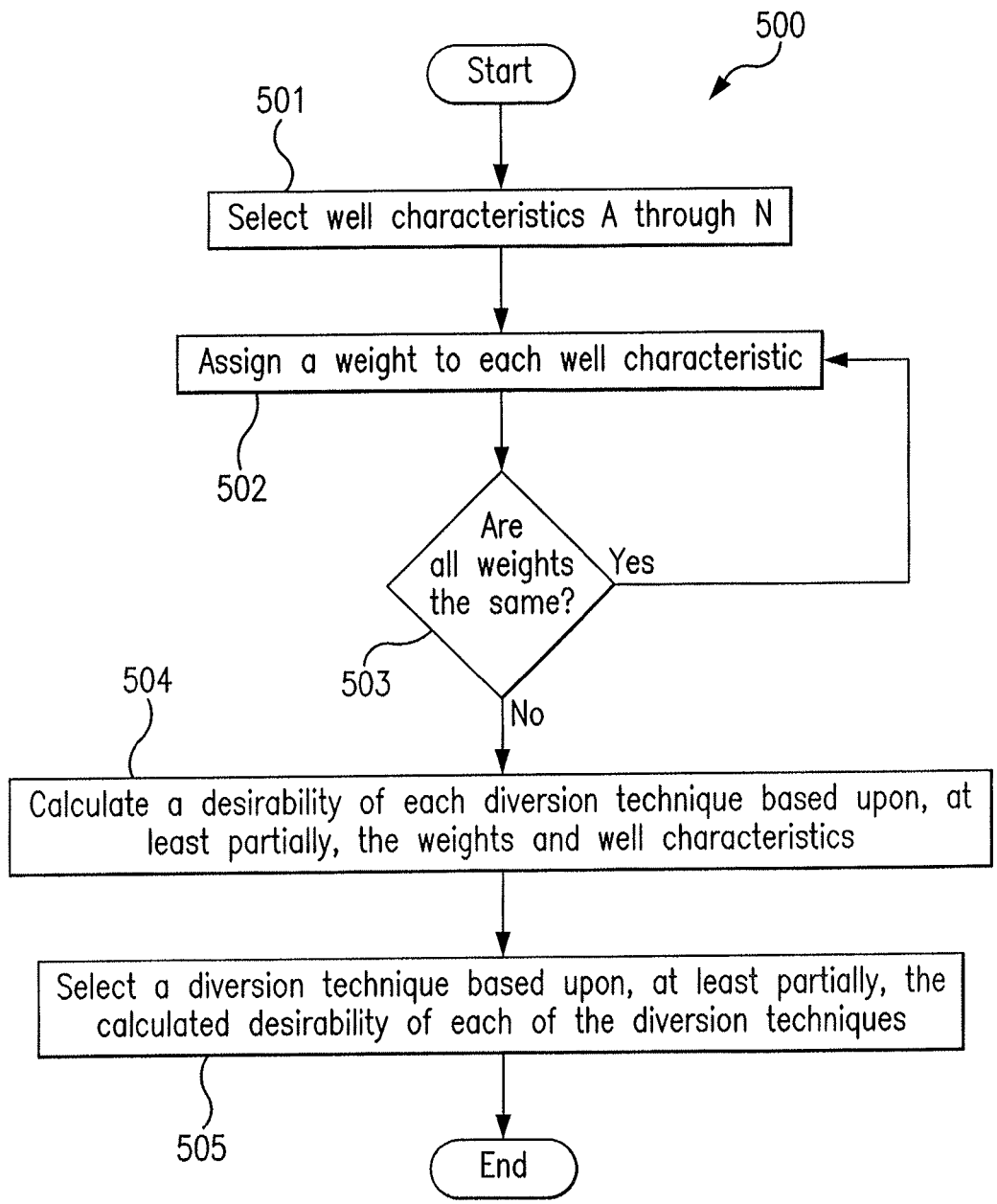
FIG. 5 is a flowchart showing an example method of selecting diversion techniques.
Figure 6:
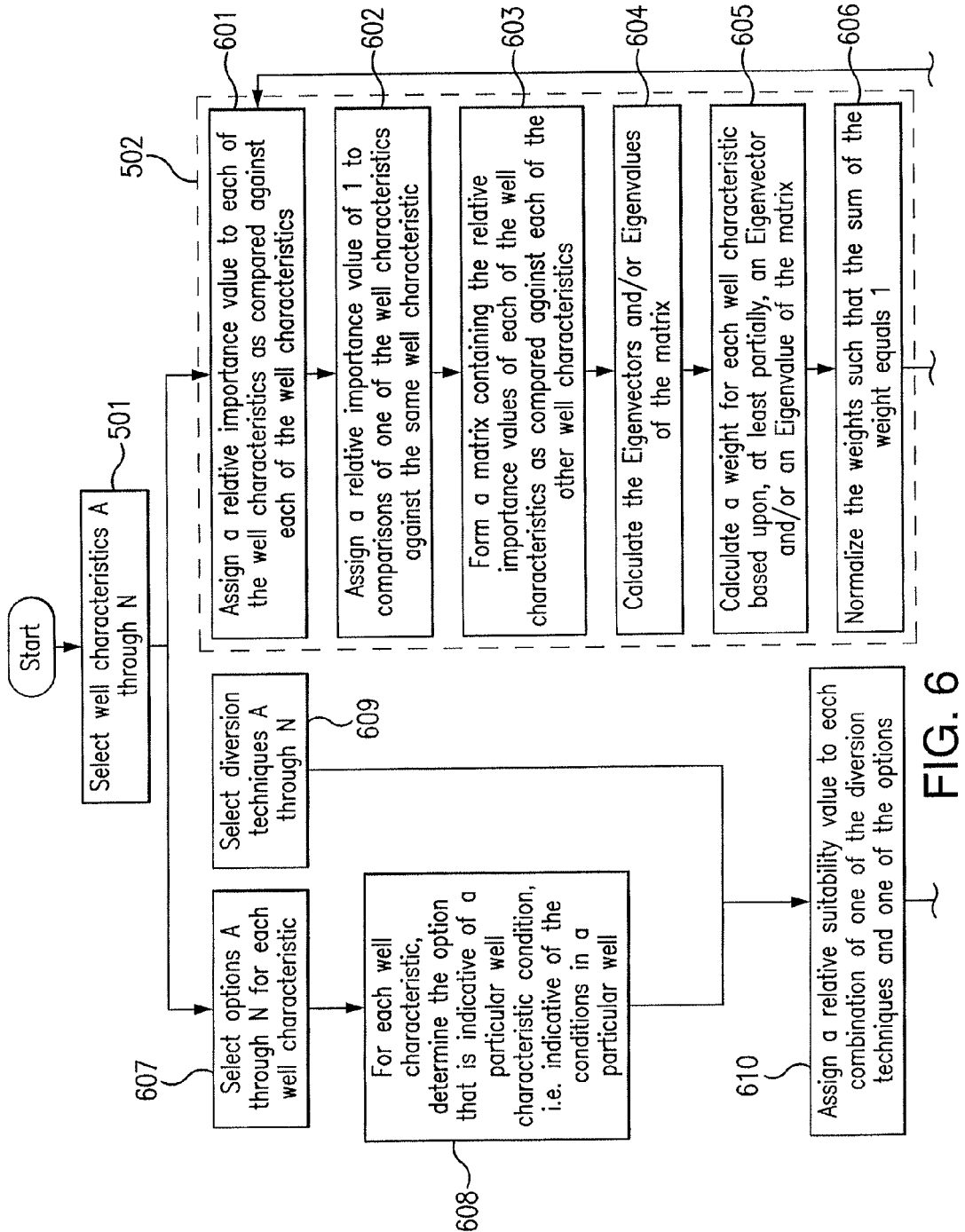
FIG. 6 is a flowchart showing a more detailed example method of selecting diversion techniques than the example method of FIG. 5.
Figure 6:
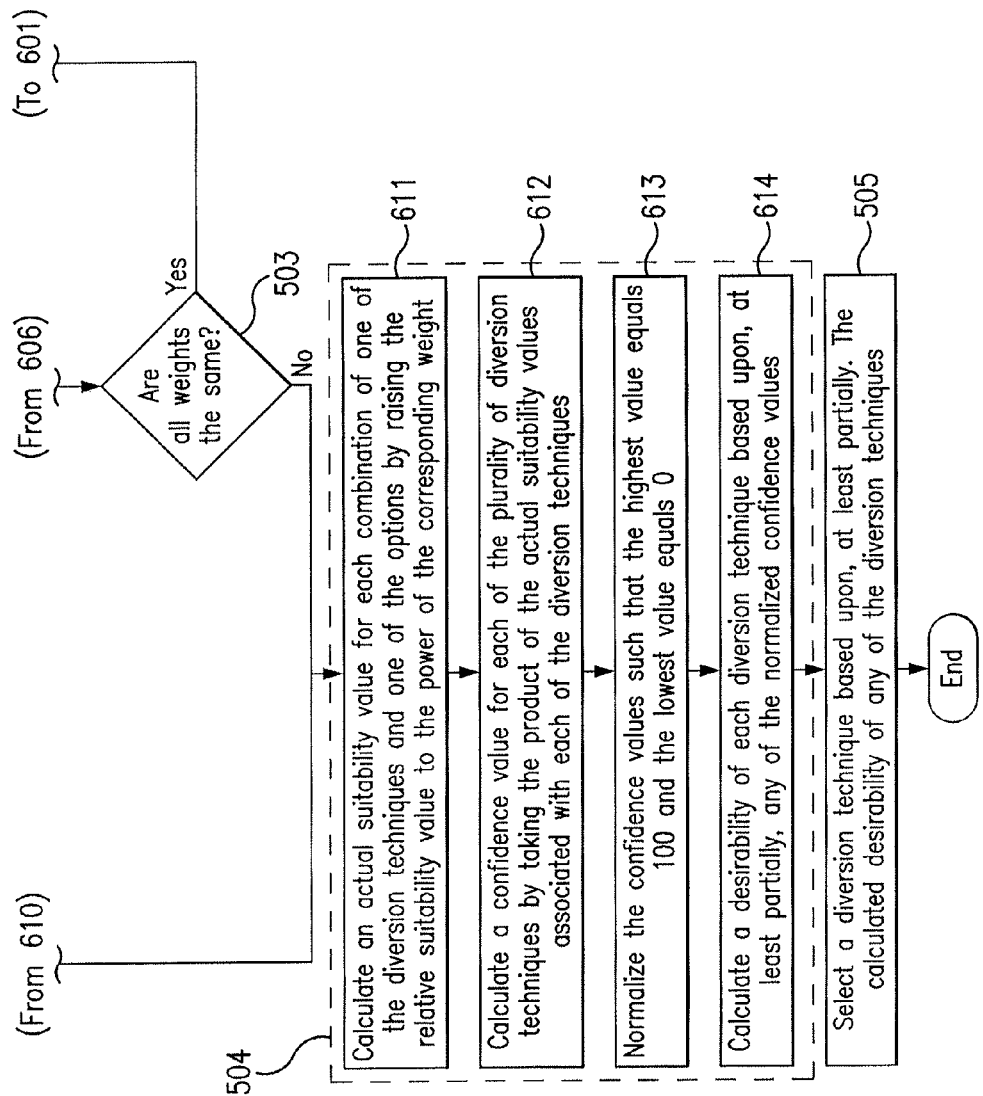
Figure 7:
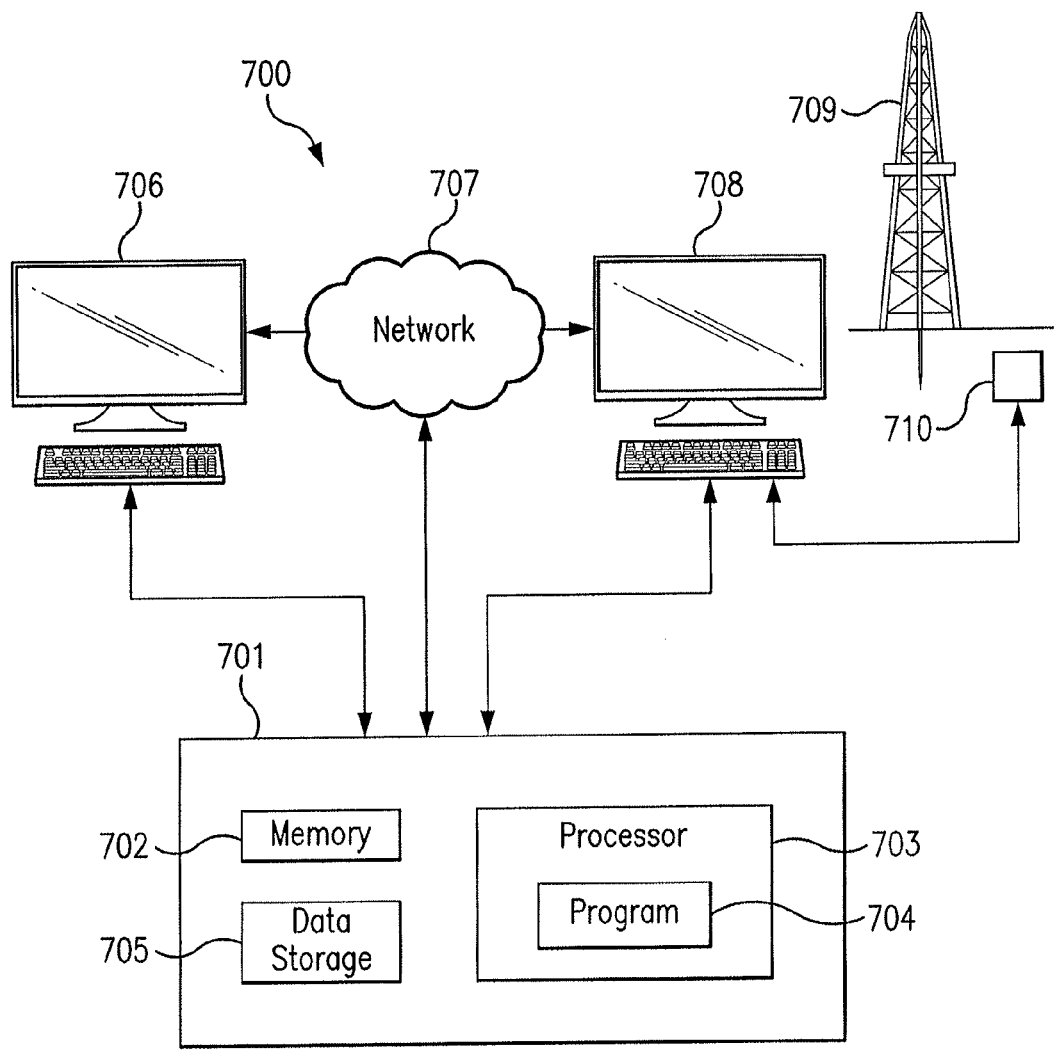
FIG. 7 is a diagram of an example system that may be used, for example, to carry out example methods disclosed in FIG. 5 and/or FIG. 6.

The following disclosure provides example techniques for doing so. FIG. 3 is a chart 300 showing example weights 304 for an example set of well characteristics 302 being evaluated. FIG. 4 is a chart 400 showing example confidence values 407 for various diversion techniques, based upon well characteristics 401 (e.g., the example set of well characteristics of FIG. 3), associated weights 402 (e.g., the example weights of FIG. 3), and relative suitability values 405 (e.g., the relative suitability values of FIG. 2). FIG. 5 is a flowchart 500 showing an example method of selecting diversion techniques. FIG. 6 is a flowchart 600 showing a more detailed example method of selecting diversion techniques than the example method of FIG. 5. FIG. 7 is a diagram of an example system 700 that may be used, for example, to carry out example methods disclosed in FIG. 5 and/or FIG. 6.

In addition to the example suitability of various diversion techniques 206 disclosed in FIG. 2, well characteristics may be associated with weights, where a weight is indicative of the importance of an associated well characteristic to the selection of a diversion technique. By selecting a diversion technique using weights, an appropriate diversion technique can be selected based upon the relative importance of various well characteristics.

FIG. 3 is a chart 300 showing example weights 304 for an example set of well characteristics 302 being evaluated. Information represented in FIG. 3 may be determined and/or evaluated by a system 700 of FIG. 7 comprising a computer system 701. Computer system 701 may further make such determination and/or evaluation by executing a diversion technique selection program 704, which may be stored on a computer readable medium.

In FIG. 3, a "Well Characteristic" column 301 (which may comprise the same well characteristics as Well Characteristic column 201) of chart 300 lists well characteristics 302 being evaluated (which may comprise the same well characteristics as well characteristics 202). A "Weight" column 303 of chart 300 lists various weights 304 associated with well characteristics 302. Each weight 304 is indicative of the importance of associated well characteristic 302 to the selection of a diversion technique. Weights 304 may be determined based upon field experience, literature, and/or by those skilled in the art. In the instance when any two or more weights 304 are not the same, this indicates that the importance of associated well characteristics 302 to the selection of a diversion technique are not the same. Thus, weights 304 may be used as a comparison of the importance of associated well characteristics 302 to the selection of a diversion technique. For example, FIG. 3 shows that temperature has a weight of 0.05 and injectivity contrast has a weight of 0.19, thus indicating that injectivity contrast is more important than temperature to the selection of a diversion technique. Furthermore, weights 304 may vary between users and over time. One weight 304 may be assigned to each well characteristic 302, as shown in FIG. 3, although other methods, including but not limited to multiple weights per well characteristic 302, may be used as well. Weights 304 may further be normalized such that a sum 305 of weights 304 equals 1 (306), although any range of values can be used for weights 304. For example, weights 304 may be represented by percentages or by values ranging from 0 to 100. Weights 304 may also have a sum 305 other than 1. Furthermore, other well characteristics, in addition to or instead of those listed in FIG. 3, can associated with weights. Still further, at minimum two well characteristics may be associated with weights, for example.

In any embodiment, a desirability of various diversion techniques may be calculated based upon, at least partially, any weights and associated well characteristics. Further, a diversion technique may be selected based upon, at least partially, a calculated desirability of any diversion technique. As an example, if, out of all well characteristics being evaluated, completion type has the largest weight of 8 compared to other well characteristics and temperature has the second largest weight of 6, this indicates that completion type is the most important well characteristic out of those being evaluated, followed by temperature. Thus, the desirability of various diversion techniques for any particular well may, for example, be calculated based upon, at least partially, the weights associated with completion type (8) and temperature (6). A diversion technique may then be selected based upon, at least partially, any calculated desirability.

A diversion technique may also be selected not only based upon well characteristics and weights, as disclosed, for example, in FIG. 3, but also based upon relative suitability values, as disclosed, for example, in FIG. 2.

FIG. 4 is a chart 400 showing example confidence values 407 for various diversion techniques, based upon well characteristics 401 (e.g., the example set of well characteristics of FIG. 3), associated weights 402 (e.g., the example weights of FIG. 3), and relative suitability values 405 (e.g., the relative suitability values of FIG. 2). Information represented in FIG. 4 may be determined and/or evaluated by a system 700 of FIG. 7 comprising a computer system 701. Computer system 701 may further make such determination and/or evaluation by executing a diversion technique selection program 704, which may be stored on a computer readable medium.

In FIG. 4, "Well Characteristic" column 201 of chart 400 lists various well characteristics 401 being evaluated (which may comprise well characteristics 302 and/or well characteristics 202). For example, in chart 400, well characteristics 401 being evaluated are completion type, well deviation, temperature, and injectivity contrast. Other well characteristics can be evaluated in addition to or instead of those shown, such as permeability, interval length, reservoir type, reservoir fluid, well type, placement technique, and other well characteristics known to persons of skill in the art.

"Weight" column 303 of chart 400 lists weights 402 (which may comprise weights 304) associated with well characteristics 401. Each weight 402 is indicative of the importance of associated well characteristic 401 to the selection of a diversion technique. Weights 402 may be determined based upon field experience, literature, and/or by those skilled in the art. When any two or more weights 402 are not the same, this indicates that the importance of associated well characteristics 401 to the selection of a diversion technique are not the same. Thus, weights 402 may be used as a comparison of the importance of associated well characteristics 401 to the selection of a diversion technique. For example, FIG. 4 shows that temperature has a weight of 0.05 and injectivity contrast has a weight of 0.19, thus indicating that injectivity contrast is more important than temperature to the selection of a diversion technique. Furthermore, weights 402 may vary between users and over time. One weight 402 may be assigned to each well characteristic 401, as shown in FIG. 4, although other methods, including but not limited to multiple weights per well characteristic 401, may be used as well. Weights 402 may further be normalized such that the sum of weights 402 equals 1, although any range of values can be used for weights 402. For example, weights 402 may be represented by percentages or by values ranging from 0 to 100. Weights 402 may also have a sum other than 1. Furthermore, other well characteristics, in addition to or instead of those listed in FIG. 4, can be associated with weights. Still further, at minimum two well characteristics may be associated with weights, for example.

A "Well Characteristic Options" column 403 of chart 400 lists certain options 404 that are indicative of particular well characteristic 401 conditions, i.e. indicative of conditions in a particular well. For example, options 204 represent example options available for a completion type well characteristic, options 204 comprising open hole, perforated, gravel packed, and slotted liner. In contrast, options 404 show that, for a particular well, completion type may be open hole, well deviation may be <10 degrees, etc. For any particular well, one well option 404 may apply, for example. Options 404 are merely examples, and any other options pertaining to well characteristics 401 known to persons of skill in the art can be used. For other well characteristics 401, options 404 may include appropriate corresponding options for any particular well. For example, for a temperature well characteristic for any particular well, options 404 may include 0-50 degrees F., 50-100 degrees F., or 100-150 degrees F., etc. FIG. 4 shows an example where temperature option 404 may be <150 degrees F.

"Diversion Techniques" column 205 of chart 400 lists diversion techniques 206 being evaluated. In chart 400, diversion techniques 206 being evaluated include ball sealers, degradable particulates, foams, gelled acid, crosslink gel slugs, relative permeability modifiers (RPM), and no diverter. Any subset of diversion techniques 206, and/or any other diversion techniques known to persons of skill in the art, can be evaluated. Furthermore, diversion techniques 206 may include diversion technique sub-types. For example, three different types of ball sealer diversion techniques can be evaluated against each other, or against each other as well as other diversion techniques.

Once diversion techniques 206 and options 404 for each well characteristic 401 have been selected, relative suitability values 405 are assigned for each combination of option 404 and diversion technique 206. Relative suitability values 405 may comprise some or all of relative suitability values 207. Relative suitability values 405 indicate the suitability of diversion technique 206 in conditions comprising option 404. Relative suitability values 405 may be determined based upon field experience, literature, and/or by those skilled in the art. In chart 400, relative suitability values 405 range from 0 (indicating that a corresponding diversion technique is not suitable for use with a corresponding option) to 5 (indicating that a corresponding diversion technique is most suitable for use with a corresponding option). Any range of relative suitability values can be used. Furthermore, relative suitability values 405 may vary between users and over time. For example, FIG. 4 shows a relative suitability value of 4 for the intersection of a ball sealers diversion technique and a <150 degrees F. temperature, indicating that ball sealers have a high suitability in wells with a temperature of <150 degrees F. Conversely, FIG. 4 shows a relative suitability value of 0 for the intersection of a ball sealers diversion technique and a open hole completion type, indicating that ball sealers are not suitable in wells with an open hole completion type.

Once relative suitability values 405 are assigned, a confidence value 407 may be calculated for each of diversion techniques 206. In chart 400, confidence values 407 appear in a "CONFIDENCE VALUES" row 406. Confidence values 407 for each of diversion techniques 206 may be calculated based upon, at least partially, well characteristics 401 and associated weights 402 and relative suitability values 405. For example, an actual suitability value may be calculated by raising each relative suitability value 405 to the power of associated weight 402, where weights 402 may be normalized to sum to 1. Confidence value 407 for each diversion technique 206 may then be calculated by taking the product of any actual suitability values associated with each diversion technique. Confidence value 407 may then be normalized on a scale of 0 to 100. This is merely one example of calculating a confidence value. Other examples may use fewer, additional, or different steps than in the example described above.

Once confidence values 407 are determined, a desirability of various diversion techniques 206 may be calculated based upon, at least partially, any confidence values 407. For example, FIG. 4 shows that, for this particular example, gelled acid has a confidence value 407 of 79, crosslink gel slugs have a confidence value 407 of 100, and RPM has a confidence value 407 of 95. Based on confidence values 407, desirability may be calculated as a ranking, where crosslink gel slugs have a rank of 1, RPM has a rank of 2, and gelled acid has a rank of 3. Based on a calculated desirability, crosslink gel slugs may be a selected diversion technique because they have the highest desirability (for example, the highest rank) out of evaluated diversion techniques 206. This is merely one example of calculating a desirability and selection a diversion technique. Other examples may use fewer, additional, or different steps than in the example described above.

Methods that evaluate, for example, some or all of information disclosed in FIG. 1A, FIG. 1B, FIG. 2, FIG. 3, and FIG. 4 may also be used.

FIG. 5 is a flowchart 500 showing an example method of selecting diversion techniques. The example method of FIG. 5 may be carried out on or by a system 700 of FIG. 7 comprising a computer system 701. Computer system 701 may further carry out such method by executing a diversion technique selection program 704, which may be stored on a computer readable medium.

In FIG. 5, step 501 comprises selecting well characteristics A through N, where A is a first well characteristic, and N is a last well characteristic. For example, a minimum of two well characteristics may be selected. Step 502 comprises assigning a weight to each selected well characteristic, each weight indicative of the importance of an associated well characteristic to the selection of a diversion technique. Step 503 comprises determining whether all weights are the same. If all weights are the same, step 502 is repeated. If not all weights are the same, step 504 is performed. Step 504 comprises calculating a desirability of each diversion technique based upon, at least partially, weights and well characteristics. Step 505 comprises selecting a diversion technique based upon, at least partially, any calculated desirability of any of the diversion techniques.

The method disclosed in flowchart 500 is merely an example of a method of selecting diversion techniques. Other examples may use fewer, additional, or different steps. FIG. 6, for example, provides additional detail to the example method of flowchart 500.

FIG. 6 is a flowchart 600 that expands upon the example method of FIG. 5 and provides a more detailed example method of selecting diversion techniques. More specifically, steps 601, 602, 603, 604, 605, and 606 comprise an example of step 502 with additional detail. Likewise, steps 611, 612, 613, and 614 comprise an example of step 504 with additional detail. The example method of FIG. 6 may be carried out on or by a system 700 of FIG. 7 comprising a computer system 701. Computer system 701 may further carry out such method by executing a diversion technique selection program 704, which may be stored on a computer readable medium.

In FIG. 6, step 501 comprises selecting well characteristics A through N, where A is a first well characteristic, and N is a last well characteristic. Selected well characteristics may comprise completion type, temperature, injectivity contrast, permeability, interval length, reservoir type, reservoir fluid, well type, placement technique, and/or other well characteristics known to persons of skill in the art. For example, a minimum of two well characteristics may be selected.

Step 601 comprises assigning a relative importance value to each well characteristic as compared against each of the other well characteristics being evaluated. Relative importance values are indicative of, for example, how important a first well characteristic is to the selection of a diversion technique as compared to how important a second well characteristic is to the selection of a diversion technique. Relative importance values may also compare more than two well characteristics. Relative importance values may be determined based upon field experience, literature, and/or by those skilled in the art. Relative importance values may vary between users and over time. For example, each well characteristic comparison may be assigned a relative importance value on a scale of 1 to 9 based on how important a first well characteristic is to the selection of a diversion technique as compared to how important a second well characteristic is to the selection of a diversion technique. The following table provides an example scale of relative importance values and corresponding descriptions:

Example Scale of Relative Importance Values

| Relative Importance Value (Representing Relative Intensity of Importance to Selecting a Diversion Technique) | Description |
| --- | --- |
| 1 | Equal Importance |
| 2 | Weak or Slight |
| 3 | Moderate Importance |
| 4 | Moderate Plus |
| 5 | Strong Importance |
| 6 | Strong Plus |
| 7 | Very Strong Importance |
| 8 | Very Very Strong |
| 9 | Extreme Importance |

In this example, a relative importance value of 1 indicates that the two well characteristics being compared are of equal importance to the selection of a diversion technique. Furthermore, in this example, a relative importance value of 9 indicates that the first well characteristic is extremely important to the selection of a diversion technique as compared to the second well characteristic. For example, completion type versus well deviation may be assigned a relative importance value of 4, completion type versus temperature may be assigned a relative importance value of 7, and well deviation versus temperature may be assigned a relative importance value of 6.

For converse comparisons of any two well characteristics, relative importance values of the converse comparisons may be reciprocal values of one another. For example, if $\alpha_{ij}$ is the relative importance value of well characteristic i versus well characteristic j, then the relative importance value of well characteristic j versus well characteristic i is:

$$\alpha_{ji} = \frac{1}{a_{ij}}$$

Thus, for example, well deviation versus completion type may be assigned a relative importance value of 1/4, temperature versus completion type may be assigned a relative importance value of 1/7, and temperature versus well deviation may be assigned a relative importance value of 1/6.

Step 602 comprises assigning a relative importance value of 1 to comparisons of one well characteristics against the same well characteristic. For example, a comparison of completion type against completion type may be 1.

Step 603 comprises forming a matrix containing relative importance values of each of well characteristics as compared against each of the other well characteristics. For example, the matrix may comprise rows, columns, and cells, wherein rows comprise at least two well characteristics, wherein columns comprise the same number and order of well characteristics as exist in the rows, and wherein each cell comprises a relative importance value corresponding to a comparison of the well characteristic of the corresponding row against the well characteristic of the corresponding column. For example:

Example Matrix of Relative Importance Values

| Well Characteristics | Completion Type | Well Deviation | Temperature |
| --- | --- | --- | --- |
| Completion Type | 1 | 4 | 7 |
| Well Deviation | 1/4 | 1 | 6 |
| Temperature | 1/7 | 1/6 | 1 |

Step 604 comprises calculating the Eigenvectors and/or Eigenvalues of the matrix.

Step 605 comprises calculating a weight for each well characteristic based upon, at least partially, an Eigenvector and/or an Eigenvalue of the matrix. Each weight is indicative of the importance of its associated well characteristic to the selection of a diversion technique. For example, if an Eigenvector comprises all real numbers, a weight for each well characteristic may be the absolute value of the real numbers of the Eigenvector. For example, in the matrix shown above, one Eigenvector comprises three real numbers, which may be assigned to the well characteristics being evaluated such that completion type has a weight of 8.75175 (the first number of the Eigenvector), well deviation has a weight of 3.29918 (the second number of the Eigenvector), and temperature has a weight of 0.82914 (the third number of the Eigenvector). This is merely one example of how weights may be calculated, and other methods known to persons skilled in the art are contemplated.

Further, Step 606 comprises normalizing assigned weights such that the sum of weights equals 1. For example, in the matrix shown above, weights may be normalized such that completion type has a weight of 0.6795, well deviation has a weight of 0.2561, and temperature has a weight of 0.0644. This is merely one example of how weights may be calculated, and other examples may use fewer, additional, or different steps.

Step 503 comprises determining whether all weights are the same. If all weights are the same, step 601 is repeated. If not all weights are the same, step 611 is performed.

Step 607 comprises selecting options A through N for each well characteristic, where A is a first option, and N is a last option. For example, options available for a completion type well characteristic may comprise open hole, perforated, gravel packed, and slotted liner. Any subset of these options, and/or any other options pertaining to completion type known to persons of skill in the art, can be used.

Step 608 comprises, for each well characteristic, determining an option that is indicative of a particular well characteristic condition, i.e. indicative of conditions in a particular well. For any particular well (for example, a well for which selecting a diversion technique is desired), one option may apply, for example. For a particular well, for example, completion type may be open hole, but not perforated, gravel packed, or slotted liner.

Step 609 comprises selecting diversion techniques A through N, where A is a first diversion technique, and N is a last diversion technique.

Step 610 comprises assigning a relative suitability value to each combination of an option and a diversion technique. Relative suitability values indicate the suitability of a diversion technique in conditions comprising an option. Relative suitability values may be determined based upon field experience, literature, and/or by those skilled in the art. For example, relative suitability values may range from 0 (indicating that a corresponding diversion technique is not suitable for use with a corresponding option) to 5 (indicating that a corresponding diversion technique is most suitable for use with a corresponding option). Any range of relative suitability values can be used. Furthermore, relative suitability values may vary between users and over time. For example, a relative suitability value of 0 may be assigned to the use of a ball sealers diversion technique in conditions comprising an open hole completion type, thus indicating that ball sealers are not suitable in wells with an open hole completion type.

Step 611 comprises calculating an actual suitability value for each combination of an option and a diversion technique by raising an associated relative suitability value to the power of its corresponding weight. Calculating an actual suitability value may be accomplished by using the following formula:

(actual suitability value)=$(\alpha_{Kj})^{\omega j}$,

Where $(\alpha_{Kj})$ refers to relative suitability values and $\omega j$ refers to associated weights. For example, if a relative suitability value of 3 represents the suitability of a certain diversion technique in conditions comprising a certain option associated with a certain completion type, where completion type has an associated weight of 0.5, then an actual suitability value may be equal to $3^{(0.5)}=1.732$. As another example, using relative suitability values 405 from FIG. 4, degradable particulates 206 has relative suitability value 405 equal to 5 for well deviation 401 of <10 degrees 404. Well deviation 401 has an associated weight of 0.125 (402). Thus, an actual suitability value may be equal to $5^{(0.125)}=1.223$. These are merely examples of how actual suitability values may be calculated, and other examples may use fewer, additional, or different steps.

Step 612 comprises calculating a confidence value for each diversion technique by taking the product of any actual suitability values associated with each diversion technique. Calculating a confidence value may be accomplished by using the following formula:

$$P(A_K) = \prod_{j=1}^{n} (\alpha_{Kj})^{\omega j}, \text{ for } K = 1, 2, 3, \ldots, m.$$

For example, as shown in the example table below, if actual suitability values associated with a particular diversion technique comprise 1.2, 1.5, 1.7, and 1.1, a confidence value may be equal to (1.2)(1.5)(1.7)(1.1)=3.366.

Example Calculation of Confidence Values Based on Actual Suitability Values

| Well Characteristic | Well Characteristic Option | Ball Sealers | Degradable Particulates |
|---|---|---|---|
| Completion Type | Perforated | 1.2 | 1.1 |
| Well Deviation | 89 degrees | 1.5 | 1.9 |
| Temperature | 180 degrees F. | 1.7 | 1.4 |
| Injectivity Contrast | Low | 1.1 | 1.4 |
| CONFIDENCE VALUE | | 3.366 | 4.096 |

Step 613 comprises normalizing confidence values. For example, confidence values can be normalized such that a highest confidence value equals 100 and a lowest confidence value equals 0, though other scales for normalizing confidence values may be used.

Step 614 comprises calculating a desirability of each diversion technique based upon, at least partially, any normalized confidence values. For example, if gelled acid has a confidence value of 79, crosslink gel slugs have a confidence value of 100, and RPM has a confidence value of 95, then based upon these confidence values, desirability may be calculated as a ranking, where crosslink gel slugs have a rank of 1, RPM has a rank of 2, and gelled acid has a rank of 3. As another example, desirability may be calculated to be the same as any confidence values.

Step 505 comprises selecting a diversion technique based upon, at least partially, a calculated desirability of any diversion technique. For example, if crosslink gel slugs have the highest calculated desirability out of any evaluated diversion techniques, crosslink gel slugs may be a selected diversion technique because they have the highest calculated desirability (for example, the highest rank).

The method disclosed in flowchart 600 is merely an example of a method of selecting diversion techniques. Other examples may use fewer, additional, or different steps. For example, desirability may be calculated based upon any values, weights, etc. referenced in flowchart 600, flowchart 500, chart 400 and descriptions thereof.

FIG. 7 is a diagram of an example system 700 that may be used, for example, to carry out example methods disclosed in FIG. 5 or FIG. 6. Further, system 700 may be operable to determine and/or evaluate information represented in FIG. 2, FIG. 3, and/or FIG. 4. System 700 comprises a computer system 701, computer system 701 comprising a memory 702, a data storage 705, and a processor 703. Processor 703 may be configured to run a diversion technique selection program 704. Further, diversion technique selection program 704 may be stored, for example, as a set of instructions, in memory 702 or data storage 705. Furthermore, memory 702 and data storage 705 may exist as a single component that performs some or all of the functions of memory 702 and/or data storage 705, and diversion technique selection program 704 may be stored on this single component. Furthermore, diversion technique selection program 704 may exist as a set of instructions on a computer readable medium, itself a type of data storage 705. A computer readable medium may comprise a flash drive, CD ROM, DVD, RAM, hard drive, network storage, cloud storage, and/or any other computer readable medium known to persons of skill in the art. Computer system 701 is merely an example system, and other systems with different configurations an/or components known to persons of skill in the art are contemplated.

Computer system 701 may be communicatively coupled to a device 706, where device 706 may comprise a computer, display, printer, or other output, and/or a keyboard or other input. Computer system 701 may also be communicatively coupled to a network 707. Computer system 701 may also be communicatively coupled to a device 708, where device 708 is communicatively coupled to a sensor 710 that may sense conditions or other information associated with well 709. Well 709 may be similar to well 100 as shown in FIG. 1A and FIG. 1B. Device 708 may also be located or communicatively coupled to devices at or near well 709. Computer system 701 or system 700 may also be able to output and/or implement a selected diversion technique, for example, a diversion technique selected via diversion technique selection program 704, where diversion technique selection program 704 may comprise instructions that implement example methods disclosed in FIG. 5 and FIG. 6. Diversion technique selection program 704 may also determine and/or evaluate information represented in FIG. 2, FIG. 3, and/or FIG. 4. For example, computer system 701 or system 700 may select a diversion technique by running diversion technique selection program 704 and/or may display a selected diversion technique on a display or a printout. Further, computer system 701 or system 700 may, for example, initiate implementation of a diversion technique, for example, in well 709. System 700 is merely an example system, and other systems with different configurations, components, and/or functions known to persons of skill in the art are contemplated.

Although various embodiments and examples are described above, a person of skill in the art could make various alterations, additions, and omissions without departing from the spirit and scope of the claims.

What is claimed is:

1. A method of selecting diversion techniques, comprising:
for each of a plurality of well characteristics,
assigning a relative importance value to each of the plurality of well characteristics as compared against each of the plurality of well characteristics, where, for converse comparisons of any two of the well characteristics, the relative importance values of the converse comparisons are reciprocal values of one another, and where, for comparisons of one of the well characteristics against the same well characteristic, the relative importance value is equivalent to 1;
forming a matrix comprising rows, columns, and cells, wherein the rows comprise at least two of the plurality of well characteristics, wherein the columns comprise the same number and order of well characteristics as exist in the rows, and wherein each cell comprises the relative importance value corresponding to the comparison of the well characteristic of the corresponding row against the well characteristic of the corresponding column;
calculating a weight for each well characteristic represented in the matrix based upon, at least partially, at least one value selected from the group consisting of an Eigenvector of the matrix and an Eigenvalue of the matrix, the weight indicative of the importance of the well characteristic to the selection of a diversion technique, wherein not all of the weights are the same;
calculating a desirability of each of a plurality of diversion techniques based upon, at least partially, the plurality of the weights and the plurality of well characteristics; and
selecting a diversion technique based upon, at least partially, the calculated desirability of each of the plurality of diversion techniques.

2. The method of claim 1, further comprising:
implementing the selected diversion technique.

3. The method of claim 1, further comprising:
determining an option for each of the plurality of well characteristics, the option indicative of a particular well characteristic condition;
for each of the plurality of diversion techniques,
assigning a relative suitability value to each combination of one of the plurality of diversion techniques and one of the options, the relative suitability value indicative of the suitability of the diversion technique in conditions comprising the option; and
calculating the desirability of each of the plurality of diversion techniques based upon, at least partially, any of the relative suitability values.

4. The method of claim 1, further comprising:
selecting at least one of the plurality of well characteristics from the group consisting of completion type, well deviation, temperature, injectivity contrast, permeability, interval length, reservoir type, reservoir fluid, well type, and placement technique.

5. The method of claim 1, further comprising:
for each of the plurality of well characteristics,
determining an option for each of the plurality of well characteristics, the option indicative of a particular well characteristic condition;
for each of the plurality of diversion techniques,
assigning a relative suitability value to each combination of one of the plurality of diversion techniques and one of the options, the relative suitability value indicative of the suitability of the diversion technique in conditions comprising the option;
calculating an actual suitability value for each combination of one of the plurality of diversion techniques and one of the options by raising the relative suitability value to the power of the corresponding weight;
calculating a confidence value for each of the plurality of diversion techniques by taking the product of the actual suitability values associated with each of the plurality of diversion techniques; and
calculating the desirability of each of the plurality of diversion techniques based upon, at least partially, any of the confidence values.

6. A system for selecting diversion techniques, the system comprising:
a memory storage device;
a processor in communication with the memory storage device;
the processor configured to:
for each of a plurality of well characteristics,
assign a relative importance value to each of the plurality of well characteristics as compared against each of the plurality of well characteristics, where, for converse comparisons of any two of the well characteristics, the relative importance values of the converse comparisons are reciprocal values of one another, and where, for comparisons of one of the well characteristics against the same well characteristic, the relative importance value is equivalent to 1;
form a matrix comprising rows, columns, and cells, wherein the rows comprise at least two of the plurality of well characteristics, wherein the columns comprise the same number and order of well characteristics as exist in the rows, and wherein each cell comprises the relative importance value corresponding to the comparison of the well characteristic of the corresponding row against the well characteristic of the corresponding column;
calculate a weight for each well characteristic represented in the matrix based upon, at least partially, at least one value selected from the group consisting of an Eigenvector of the matrix and an Eigenvalue of the matrix, the weight indicative of the importance of the well characteristic to the selection of a diversion technique, wherein not all of the weights are the same;

calculate a desirability of each of a plurality of diversion techniques based upon, at least partially, the plurality of the weights and the plurality of well characteristics; and select a diversion technique based upon, at least partially, the calculated desirability of each of the plurality of diversion techniques.

7. The system of claim 6, wherein the processor is further configured to:

output the selected diversion technique.

8. The system of claim 6, wherein the processor is further configured to:

determine an option for each of the plurality of well characteristics, the option indicative of a particular well characteristic condition;

for each of the plurality of diversion techniques,
assign a relative suitability value to each combination of one of the plurality of diversion techniques and one of the options, the relative suitability value indicative of the suitability of the diversion technique in conditions comprising the option; and calculate the desirability of each of the plurality of diversion techniques based upon, at least partially, any of the relative suitability values.

9. The system of claim 6, wherein the processor is further configured to:

select at least one of the plurality of well characteristics from the group consisting of completion type, well deviation, temperature, injectivity contrast, permeability, interval length, reservoir type, reservoir fluid, well type, and placement technique.

10. The system of claim 6, wherein the processor is further configured to:

for each of the plurality of well characteristics,
determine an option for each of the plurality of well characteristics, the option indicative of a particular well characteristic condition;

for each of the plurality of diversion techniques,
assign a relative suitability value to each combination of one of the plurality of diversion techniques and one of the options, the relative suitability value indicative of the suitability of the diversion technique in conditions comprising the option;

calculate an actual suitability value for each combination of one of the plurality of diversion techniques and one of the options by raising the relative suitability value to the power of the corresponding weight;

calculate a confidence value for each of the plurality of diversion techniques by taking the product of the actual suitability values associated with each of the plurality of diversion techniques; and calculate the desirability of each of the plurality of diversion techniques based upon, at least partially, any of the confidence values.

11. A non-transient computer readable medium having a plurality of instructions thereon for selecting diversion techniques, the plurality of instructions, when executed by a processor, cause the processor to:

for each of a plurality of well characteristics,
assign a relative importance value to each of the plurality of well characteristics as compared against each of the plurality of well characteristics, where, for converse comparisons of any two of the well characteristics, the relative importance values of the converse comparisons are reciprocal values of one another, and where, for comparisons of one of the well characteristics against the same well characteristic, the relative importance value is equivalent to 1;

form a matrix comprising rows, columns, and cells, wherein the rows comprise at least two of the plurality of well characteristics, wherein the columns comprise the same number and order of well characteristics as exist in the rows, and wherein each cell comprises the relative importance value corresponding to the comparison of the well characteristic of the corresponding row against the well characteristic of the corresponding column;

calculate a weight for each well characteristic represented in the matrix based upon, at least partially, at least one value selected from the group consisting of an Eigenvector of the matrix and an Eigenvalue of the matrix, the weight indicative of the importance of the well characteristic to the selection of a diversion technique, wherein not all of the weights are the same;

determine an option for each of the plurality of well characteristics, the option indicative of a particular well characteristic condition;

for each of the plurality of diversion techniques,
assign a relative suitability value to each combination of one of the plurality of diversion techniques and one of the options, the relative suitability value indicative of the suitability of the diversion technique in conditions comprising the option;

calculate an actual suitability value for each combination of one of the plurality of diversion techniques and one of the options by raising the relative suitability value to the power of the corresponding weight;

calculate a confidence value for each of the plurality of diversion techniques by taking the product of the actual suitability values associated with each of the plurality of diversion techniques; and calculate a desirability of each of a plurality of diversion techniques based upon, at least partially, any of the confidence values, the plurality of the weights, and the plurality of well characteristics; and select a diversion technique based upon, at least partially, the calculated desirability of each of the plurality of diversion techniques.

12. The non-transient computer readable medium of claim 11, wherein the plurality of instructions further cause the processor to:

output the selected diversion technique.

13. The non-transient computer readable medium of claim 11, wherein the plurality of instructions further cause the processor to:

select at least one of the plurality of well characteristics from the group consisting of completion type, well deviation, temperature, injectivity contrast, permeability, interval length, reservoir type, reservoir fluid, well type, and placement technique.

* * * * *